US012651366B2

(12) United States Patent
Steven et al.

(10) Patent No.: US 12,651,366 B2
(45) Date of Patent: Jun. 9, 2026

(54) IMAGE-BASED ADJUSTMENT OF DISPLAY CONTENT IN A HEAD-MOUNTED USER DEVICE

(71) Applicant: Hewlett-Packard Development Company, L.P., Spring, TX (US)

(72) Inventors: Christopher Allan Steven, Spring, TX (US); Andre da Fonte Lopes da Silva, Palo Alto, CA (US); Derek Kyle Joseph Kanas, Spring, TX (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 18/291,789

(22) PCT Filed: Jul. 30, 2021

(86) PCT No.: PCT/US2021/071062

§ 371 (c)(1),
(2) Date: Jan. 24, 2024

(87) PCT Pub. No.: WO2023/009166

PCT Pub. Date: Feb. 2, 2023

(65) Prior Publication Data

US 2025/0095183 A1       Mar. 20, 2025

(51) Int. Cl.
*G06T 7/70*          (2017.01)

(52) U.S. Cl.
CPC ...... *G06T 7/70* (2017.01); *G06T 2207/20081* (2013.01)

(58) Field of Classification Search
CPC ........................ G06T 7/70; G06T 2207/20081
See application file for complete search history.

(56) References Cited

U.S. PATENT DOCUMENTS

2014/0364208 A1 * 12/2014 Perry ...................... A63F 13/30
                                                              463/31
2018/0300551 A1 * 10/2018 Luccin ................... H04N 23/80
2020/0265745 A1 *  8/2020 Buras ...................... A61B 8/461
2021/0088787 A1 *  3/2021 Lanman ............. G02B 27/0172
2022/0157027 A1 *  5/2022 Ma ...................... G02B 27/0093
2025/0029170 A1 *  1/2025 Chachek ............... H04W 4/024

OTHER PUBLICATIONS

Gourlay et al., "Head-Mounted-Display Tracking for Augmented and Virtual Reality", Information Display Jan. 17, 2017, 5 pages.
Wikipedia, VR positional tracking last edited on Jul. 6, 2021, 9 pages.

* cited by examiner

*Primary Examiner* — Robert J Michaud
(74) *Attorney, Agent, or Firm* — Quarles & Brady LLP

(57)          ABSTRACT

In some examples, a computer receives an image of a head-mounted user device that is separate from the computer, the head-mounted user device including a display device. The computer determines, based on the image of the head-mounted user device, a position of the head-mounted user device, and based on the determined position of the head-mounted user device, adjusts display content in the display device of the head-mounted user device.

20 Claims, 4 Drawing Sheets

Computer 400

Communication Interface 402

Hardware Processor 404

Storage Medium 406

Image Reception Instructions 408

Position Determination Instructions 410

Machine Learning Model 412

Display Content Adjustment Instructions 414

Storage Medium 300

Image Reception Instructions 302

Position Determination Instructions 304

Display Content Adjustment Instructions 306

IMAGE-BASED ADJUSTMENT OF DISPLAY CONTENT IN A HEAD-MOUNTED USER DEVICE

BACKGROUND

A head-mounted user device refers to an electronic device that can be worn on the head of a user. The head-mounted user device includes a display device (or multiple display devices) that can be viewed by a user while the head-mounted device is worn by the user.

BRIEF DESCRIPTION OF THE DRAWINGS

Some implementations of the present disclosure are described with respect to the following figures.

Figures 1A, 1B:
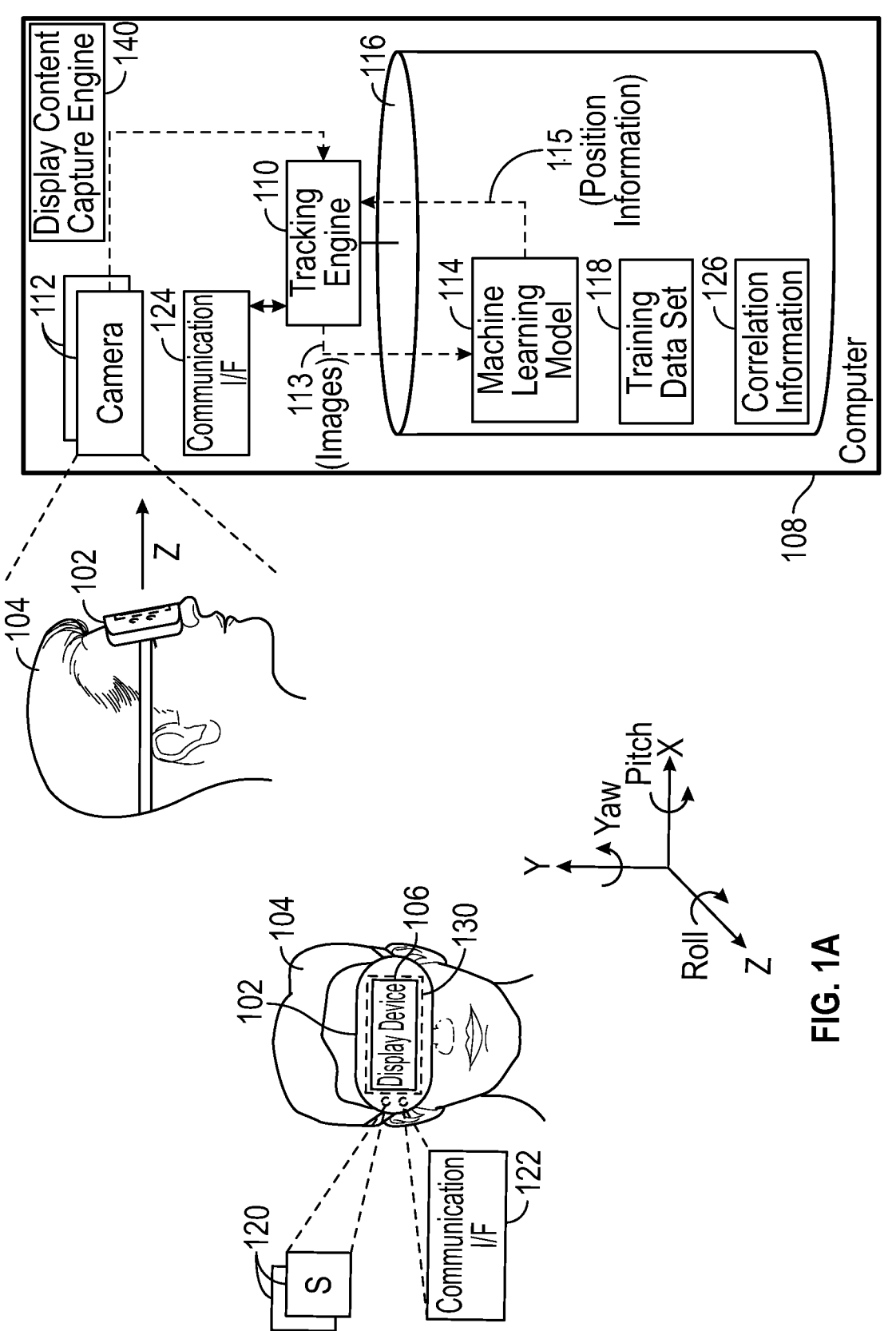
FIGS. 1A-1B show an arrangement to track a head-mounted user device, according to some examples.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

In the present disclosure, use of the term "a," "an," or "the" is intended to include the plural forms as well, unless the context clearly indicates otherwise. Also, the term "includes," "including," "comprises," "comprising," "have," or "having" when used in this disclosure specifies the presence of the stated elements, but do not preclude the presence or addition of other elements.

A head-mounted user device can be in the form of eyewear (e.g., electronic glasses, electronic goggles, etc.) worn over an eye or both eyes of the user. In some examples, the eyewear includes a display device. In further examples, the eyewear includes two display devices, with a corresponding display device in front of each respective eye of the user. In other examples, a head-mounted user device can be a different type of user-wearable device that can be mounted to a user's head and that has a display device (or multiple display devices) that can be viewed by the user.

In some examples, a head-mounted user device can display augmented reality content or virtual reality content in a display device of the head-mounted user device. Augmented reality content refers to content that includes an image of actual physical objects as well as additional content that augments the image of actual physical objects. Virtual reality content refers to content that is simulated.

When viewing displayed content on a display device of a head-mounted user device, the content that is displayed in the display device may depend upon an orientation of the head-mounted user device. For example, as the user moves the user's head while viewing the displayed content, the displayed content can change with the movement of the user's head. The adjustment of the displayed content is to allow the user to perceive that the environment being viewed by the user is changing with a changing point of view of the user.

In some examples, the tracking of head movements and the adjustment of the displayed content in the display device of the head-mounted user device is performed by a processing resource of the head-mounted user device. For example, the head-mounted user device can include a camera (or multiple cameras) that can capture images of the environment around the user. Based on the captured images of the environment, the processing resource of the head-mounted user device can determine the orientation of the head-mounted user device. A downside of using a processing resource of the head-mounted user device to track movements of the head-mounted user device is that a higher capacity processing resource would have to be included in the head-mounted user device to perform the processing-intensive image processing of images of the environment around the user. A higher capacity processing resource (e.g., a microprocessor, a microcontroller, a graphics processor, etc.) can be more costly and can thus add to the overall cost of the head-mounted user device. Additionally, a higher capacity processing resource may be associated with increased use of other resources, such as memory resources. In addition, the processing associated with tracking movements of the head-mounted user device can consume more power that can deplete a battery of the head-mounted user device. Also, including cameras on the head-mounted user device can increase the form factor, size, and weight of the head-mounted user device.

Another example technique of tracking movements of the head-mounted user device involves placing markers, such as in the form of light emitting diodes (LEDs), on the head-mounted user device. Cameras on a remote console that is separate from the head-mounted user device can then track the markers. However, having to include markers on the head-mounted user device can add to the complexity and cost of the head-mounted user device.

In accordance with some implementations of the present disclosure, machine learning based techniques or mechanisms implemented in a computer (that is separate from a head-mounted user device) are provided to track the movement of the head-mounted user device, based on captured images of the head-mounted user device. A processing resource of the separate computer can be used to perform the image processing for tracking the movement of the head-mounted user device. As a result, a smaller capacity processing resource can be included in the head-mounted user device, which can reduce the cost of the head-mounted user device and also reduce the overall power consumption of the head-mounted user device. Additionally, in some examples, cameras can be omitted from the head-mounted user device, which can decrease the size, form factor, and weight of the head-mounted user device.

FIGS. 1A-1B show an example arrangement that uses computer vision object tracking (implemented in a computer 108) to track movement of a head-mounted user device 102 that is worn on a head 104 of a user. The head-mounted user device 102 includes a display device 106 that can be provided in front of the eyes of the user.

Although reference is made to a "display device" in the singular sense, it is noted that the display device 106 can represent multiple display devices in other examples, in which a first display device is provided in front of the left eye and a second display device is provided in front of the right eye.

FIG. 1A is a perspective view of the head-mounted user device 102 as worn on the user's head 104. The X, Y, and Z axes are also shown in FIG. 1A, where a plane defined in the X and Y axes is generally parallel to a display surface of the display device 106, and the Z axis corresponds to a depth of view of the user if looking at an environment in front of the user.

FIG. 1A also show several rotational dimensions along which the head-mounted user device 102 can rotate. The rotation dimensions include the yaw, pitch, and roll dimensions. The yaw dimension is with respect to the Y axis, the pitch dimension is with respect to the X axis, and the roll dimension is with respect to the Z axis.

The computer 108 includes a tracking engine 110 to track movements of the head-mounted user device 102 using computer vision image processing of images of the head-mounted user device 102.

As used here, an "engine" can refer to a hardware processing circuit, which can include any or some combination of a microprocessor, a core of a multi-core microprocessor, a microcontroller, a programmable integrated circuit, a programmable gate array, or another hardware processing circuit. Alternatively, an "engine" can refer to a combination of a hardware processing circuit and machine-readable instructions (software and/or firmware) executable on the hardware processing circuit.

The computer 108 can include a single computer or multiple computers. Examples of computers include any or some combination of the following: a server computer, a notebook computer, a desktop computer, a game console, and so forth.

The computer 108 includes a camera 112 (or multiple cameras 112) that is (are) able to capture images of the head-mounted user device 102 when worn on the user's head 104.

The ensuing discussion will refer to "camera" in the singular sense. However, it is noted that "camera" can refer to one camera or multiple cameras.

The camera 112 can be part of the computer 108 or can be separate from the computer 108 and communicatively coupled to the computer 108, such as over a wireless or wired link. In further examples, one camera can be part of the computer 108, and another camera can be separate from the computer 108.

The camera 112 can be used to capture color images of the head-mounted user device 102, grayscale images of the head-mounted user device 102, infrared images of the head-mounted user device 102, and/or any other types of images of the head-mounted user device 102. The images of the head-mounted user device 102 that are captured by the camera 112 can be still images or video images.

The tracking engine 110 uses a machine learning model 114, which can be stored in a data repository 116 of the computer 108. The data repository 116 can be implemented using a storage device or multiple storage devices, including disk-based storage devices, solid state storage devices, memory devices, and so forth.

The data repository 116 can be part of the computer 108, or can be separate from the computer 108.

The data repository 116 can also store a training data set 118 that is used to train the machine learning model 114. The data repository 116 can also store correlation information 126 that correlates sizes of a head-mounted user device in images to corresponding depths in the Z axis (discussed further below).

The machine learning model 114 implements a self-learning process that learns how to recognize positions of head-mounted user devices (including the head-mounted user device 102) based on the training data set 118.

As used here, a "position" of a head-mounted user device can refer to a coordinate (e.g., X, Y, Z coordinates) of the head-mounted user device in a three-dimensional (3D) space and/or an orientation of the head-mounted user device, where the orientation is expressed as rotation(s) of the head-mounted user device along any or some combination of the yaw, pitch, and roll dimensions, for example.

The training data set 118 can include information that is labelled with labels representing positions of a head-mounted user device. The labels representing positions can include labels representing X, Y, and Z coordinates of the head-mounted user device, and labels representing rotational orientations including the yaw, pitch, and roll of the head-mounted user device.

In some examples, the training data set 118 can include different images of a head-mounted user device, where the different images are assigned different labels corresponding to the position of the head-mounted user device. The head-mounted user device depicted the different images can have different positions, and the labels can be assigned to the images based on an analysis (such as by a human or another entity) of the images to determine the positions of the head-mounted user device in the images. The labels are added to the training data set 118 and associated with the images. During a training phase of the machine learning model 114, the machine learning model 114 can learn, using the labels, how different views of the head-mounted user device 102 correspond to different position information.

"Position information" can refer to position representing a location of a head-mounted user device in 3D space (e.g., as expressed by the X, Y, Z coordinates) and/or an orientation expressed as a rotation along a given axis or multiple axes (e.g., the yaw, pitch, and roll dimensions).

Once trained based on the training data set 118, the machine learning model 114 can be invoked by the tracking engine 110 during an operation phase to determine the position information of the head-mounted user device 102 during use of the head-mounted user device 102. The machine learning model 114 assists in providing indications of positions of the head-mounted user device 102 based on the images of the head-mounted user device 102 acquired by the camera 112.

The training data set 118 can be continually updated during operation of the tracking engine 110 that uses the machine learning model 114, and the updated training data set 118 can in turn update the machine learning model 114. The training data set 118 can be updated based on assignment of position information to images of the head-mounted user device 102 by the machine learning model 114. During use, a user can provide feedback regarding whether or not the position information assigned by the machine learning model 114 to a given image is accurate, and if so, the assigned position information can be used as labels for the given image, which can be used to update the training data set 118.

The training data set 118 can also be updated based on operation of machine learning models similar to the machine learning model 114 in other computers for tracking other head-mounted user devices.

The machine learning model 114 can output position information 115 of the head-mounted user device 102 given input images 113 that are input into the machine learning model 114. As noted above, the position information 115 can include the following, as examples: the X, Y, Z coordinates of the head-mounted user device 102, and the yaw, pitch, and roll of the head-mounted user device 102. The X, Y, Z coordinates can be measured with respect to a reference position in a 3D space. Yaw, pitch, and roll can be expressed as angular positions (e.g., in terms of degrees of rotation) with respect to an initial rotational position corresponding to the rotation axis (the Y axis for yaw, the X axis for pitch, and the Z axis for roll).

In some examples, the head-mounted user device 102 can further include a sensor 120 (or multiple sensors 120). In the ensuing discussion, reference to "sensor" can refer to a single sensor or multiple sensors.

The sensor 120 can include an accelerometer and/or a gyroscope. An accelerometer can be used to measure acceleration of the head-mounted user device 102. A gyroscope is used to measure an angular velocity of the head-mounted user device 102.

In other examples, the sensor 120 can include a different type of sensing device to detect movement of the head-mounted user device 102, and to output corresponding measurement data representing the movement.

The head-mounted user device 102 further includes a communication interface 122, and the computer 108 includes a communication interface 124. A communication link can be established between the communication interfaces 122 and 124 over which the head-mounted user device 102 and the computer 108 are able to exchange data. In some examples, each communication interface 122 or 124 includes a transceiver to transmit and receive signals, which can be over a wireless link or a wired link. Additionally, the communication interface 122 or 124 can include a protocol layer(s) that manage(s) data communicated according to a specified protocol.

In some examples, the communication interfaces 122 and 124 can perform radio frequency (RF) communications, such as BLUETOOTH communications, communications over a wireless local area network (WLAN), communications over a cellular network, and so forth.

The computer 10 further includes a display content control engine 140 that controls the display of content in the display device 106 of the head-mounted user device 102. For example, the content to be displayed by the display device 106 can include AR content or VR content. The display content control engine 140 can produce the content to be displayed by the display device 106. The content can be communicated over the communication link between the communication interfaces 122 and 124. Upon receipt of the content from the computer 108, the head-mounted user device 102 can display the received content in the display device 106.

The position information of the head-mounted user device 102 is provided by the tracking engine 110 to the display content control engine 140. The display content control engine 140 can use the position information from the tracking engine 110 to adjust the content that is displayed by the display device 106. For example, if the user is looking up, down, right, or left, then the content displayed in the user device 106 would be different for the different points of view.

The camera 112 may sample images at a certain sampling rate, such as at 60 frames per second (FPS) or a different rate. This means that the tracking engine 110 is receiving images from the camera 112 at the sampling rate. However, the display content control engine 140 can update display content at a higher rate, such as 120 FPS or a different rate. Thus, there would be intervals between images received by the tracking engine 110 where the display content control engine 140 is without any updates of the position of the head-mounted user device 102.

In some examples, the sensor 120 (including an accelerometer and/or a gyroscope and/or any other type of sensing device) of the head-mounted user device 102 can send measurement data (over the communication link between the head-mounted user device 102 and the computer 108) at a faster rate than the sampling rate of images by the camera 112. The measurement data from the sensor 120 can be used by the tracking engine 110 to update position information in the interval between image samples, and the tracking engine 110 can provide the updated position information during the interval to the display content control engine 140 to adjust the content displayed in the display device 106.

Figure 2:
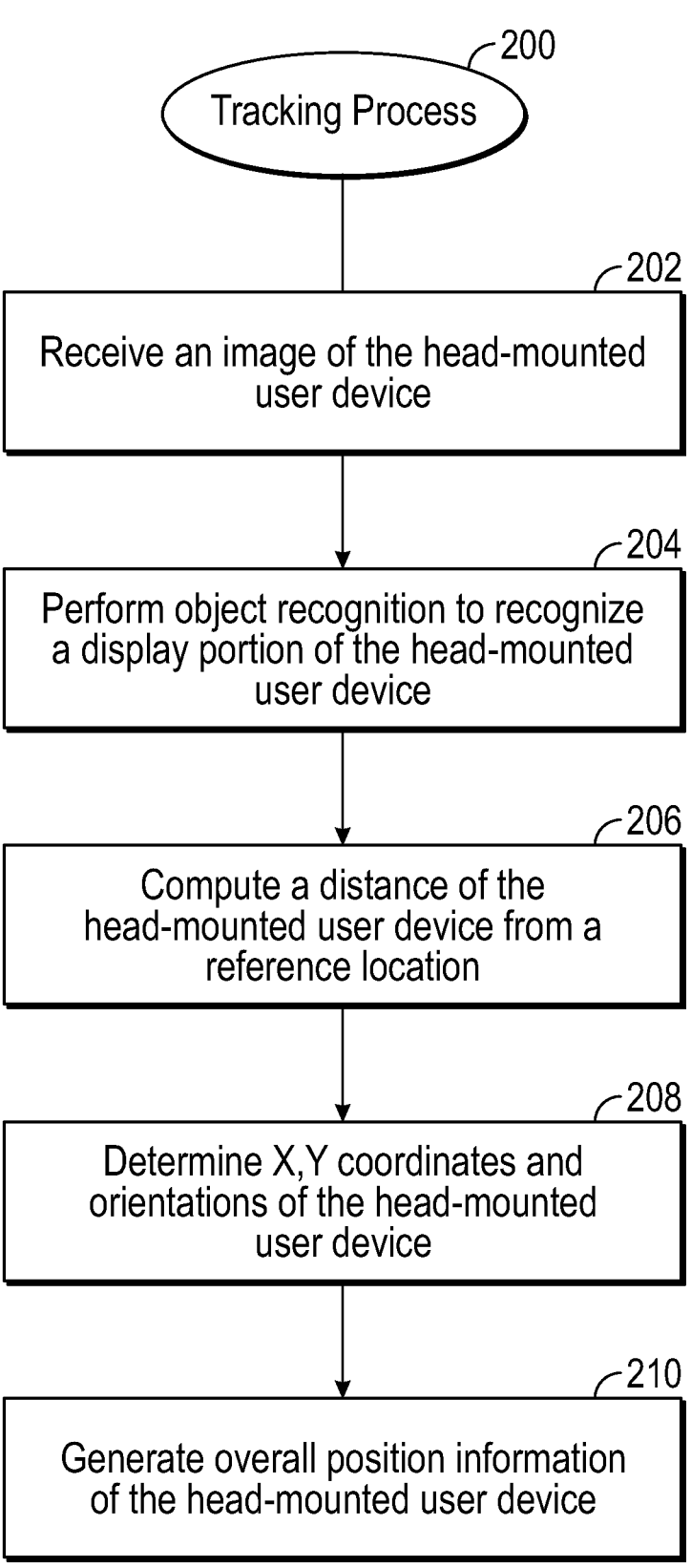
FIG. 2 is a flow diagram of a tracking process, according to some examples.

FIG. 2 is a flow diagram of a tracking process 200 to track movements of the head-mounted user device 102. The tracking process 200 can be performed by the tracking engine 110 using the machine learning model 114, for example. Although FIG. 2 shows a sequence of tasks of the tracking process 200, note that the tasks can be performed in a different order in other examples, and/or the tasks can be replaced with different tasks, some tasks can be omitted, or additional tasks can be added.

The tracking engine 110 receives (at 202) an image (or multiple images) of the head-mounted user device 102. In the ensuing discussion, reference to "image" can refer to a single image or multiple images. The image is acquired by the camera 112.

The tracking engine 110 performs (at 204) object recognition to recognize, in the received image(s), the portion of the head-mounted user device 102 that includes the display device 106. This portion of the head-mounted user device 102 that includes the display device 106 is referred to as a "display portion" identified by a boundary 130 in FIG. 1A. The display portion of the head-mounted user device 102 is at the front of the head-mounted user device 102 so that a user can view the display device 106.

In some examples, if the head-mounted user device 102 is eyewear, then the display portion includes a goggle portion or eyeglasses in front of the eyes of the user. The object recognition can be performed based on use of the machine learning model 114. The machine learning model 114 may be trained to recognize a head-mounted user device, and further, to recognize a portion of the head-mounted user device that includes the display device that can be viewed by a user.

The tracking engine 110 can define the boundary 130 that surrounds the display portion of the head-mounted user device 102. The boundary 130 can be in the form of a rectangle, multiple rectangles, or boundaries of other shapes.

The object recognition of the display portion performed by the tracking engine 110 can be based on an analysis of the received image by the machine learning model 114, in examples where the machine learning model 114 has been trained to recognize display portions of head-mounted user devices. For example, the training data set 118 can include labels that define boundaries (similar to 130) of display portions of a head-mounted user device in images that are part of the training data set 118. Based on such labels, the machine learning model 114 can learn to recognize display portions of head-mounted user devices.

The tracking engine 110 next computes (at 206) a distance of the head-mounted user device 102 from a reference location in 3D space. For example, the reference location can be the location of the camera 112 along the Z axis. Thus, the computed distance can be expressed as a Z coordinate that is relative to the reference location.

In some examples, the tracking engine 110 can determine the Z position of the head-mounted user device 102 based on a size of the head-mounted user device 102 in the received image. The tracking engine 110 is provided with information regarding the dimensions of the head-mounted user device 102, including, for example, the width and height of the display portion of the head-mounted user device 102. Different sizes of the display portion in images can correspond to different Z positions. The mapping of different sizes of the display portion to different Z positions can be performed experimentally, such as by a user or another entity. The mapping can be expressed by the correlation information 126, which correlates sizes of the display portion to different Z positions. The correlation information 126 can be provided to the computer 108, which stores the correlation information 126 in the data repository 116.

In other examples, the correlation of different sizes of a display portion of a head-mounted user device to different Z positions can be included in the machine learning model 114, which can be trained to recognize Z positions of a head-mounted user device given corresponding sizes of the display portion in respective images.

The tracking engine 110 determines (at 208) the X and Y coordinates as well as the orientations of the head-mounted user device 102. This determination is based on invoking the machine learning model 114 to output X, Y coordinates and orientations (e.g., yaw, pitch, and roll) of the head-mounted user device 102 based on the received image. The machine learning model 114 is trained to recognize the position in the X-Y plane and the yaw, pitch, and roll of the head-mounted user device 102 based on the training data set 118.

The tracking engine 110 generates (at 210) overall position information of the head-mounted user device, including a location in X, Y, Z space and the yaw, pitch, and roll of the head-mounted user device 102.

Figures 3, 4:
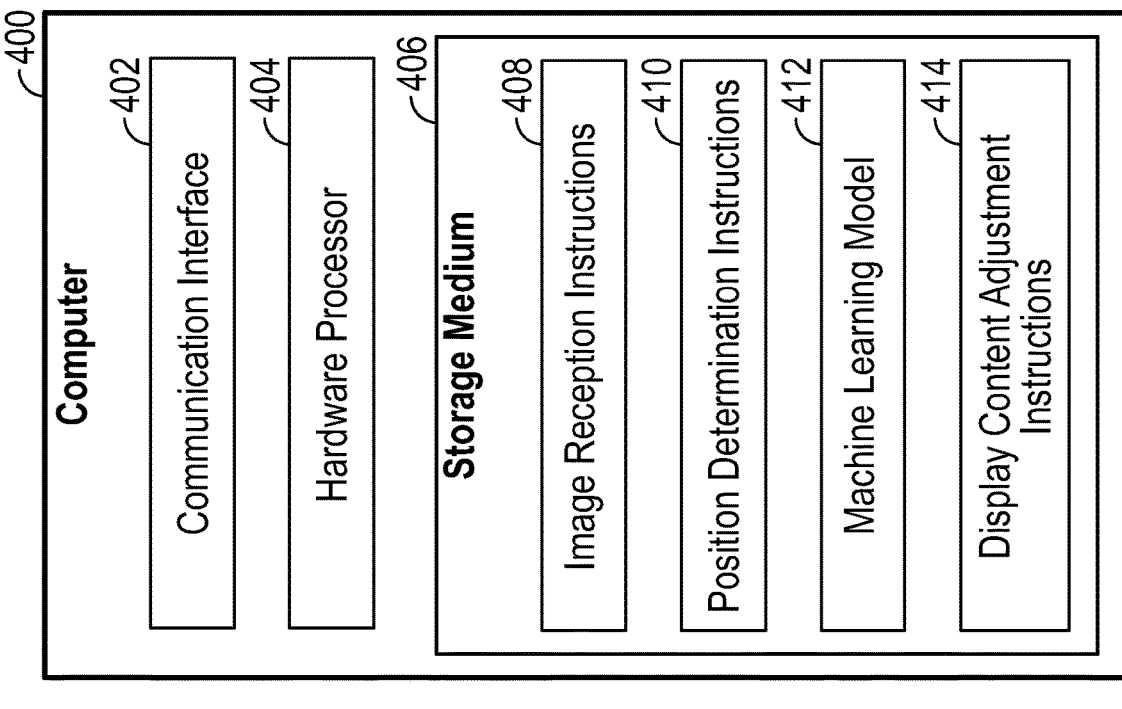
FIG. 3 is a block diagram of a storage medium storing machine-readable instructions, according to some examples.
FIG. 4 is a block diagram of a computer according to some examples.

FIG. 3 is a block diagram of a non-transitory machine-readable or computer-readable storage medium 300 storing machine-readable instructions that upon execution cause a computer (e.g., 108 in FIG. 1B) to perform various tasks.

The machine-readable instructions include image reception instructions 302 to receive an image of a head-mounted user device that is separate from the computer, where the head-mounted user device includes a display device (e.g., 106 in FIG. 1A).

The machine-readable instructions include position determination instructions 304 to determine, based on the image of the head-mounted user device, a position of the head-mounted user device.

The machine-readable instructions include display content adjustment instructions 306 to, based on the determined position of the head-mounted user device, adjust display content in the display device of the head-mounted user device.

In some examples, the determining of the position of the head-mounted user device based on the image of the head-mounted user device is based on a machine learning model (e.g., 114 in FIG. 1B).

In some examples, the machine learning model is trained using a training data set (e.g., 118 in FIG. 1B) that includes a labelled representation of images of the head-mounted user device.

In some examples, the determining of the position of the head-mounted user device includes determining a distance of the head-mounted user device along a distance axis (e.g., Z axis of FIG. 1A)

In some examples, the determining of the position of the head-mounted user device includes determining a location of the head-mounted user device in an X-Y plane.

In some examples, the determining of the position of the head-mounted user device includes determining a rotation (e.g., yaw, pitch, and/or roll) of the head-mounted user device.

FIG. 4 is a block diagram of a computer 400 that includes a communication interface 402 to communicate with a head-mounted user device that has a display device.

The computer 400 further includes a hardware processor 404 (or multiple hardware processors). A hardware processor can include a microprocessor, a core of a multi-core microprocessor, a microcontroller, a programmable integrated circuit, a programmable gate array, or another hardware processing circuit.

The computer 400 further includes a storage medium 406 storing machine-readable instructions executable on the hardware processor 404 to perform various tasks. Machine-readable instructions executable on a hardware processor can refer to the instructions executable on a single hardware processor or the instructions executable on multiple hardware processors.

The machine-readable instructions in the storage medium 406 include image reception instructions 408 to receive an image of the head-mounted user device.

The machine-readable instructions in the storage medium 406 include position determination instructions 410 to determine, based on the image of the head-mounted user device and using a machine learning model, a position of the head-mounted user device.

The machine-readable instructions in the storage medium 406 include display content adjustment instructions 412 to, based on the determined position of the head-mounted user device, adjust a display content in the display device of the head-mounted user device, where the display content is provided from the computer to the head-mounted user device through the communication interface.

Figure 5:
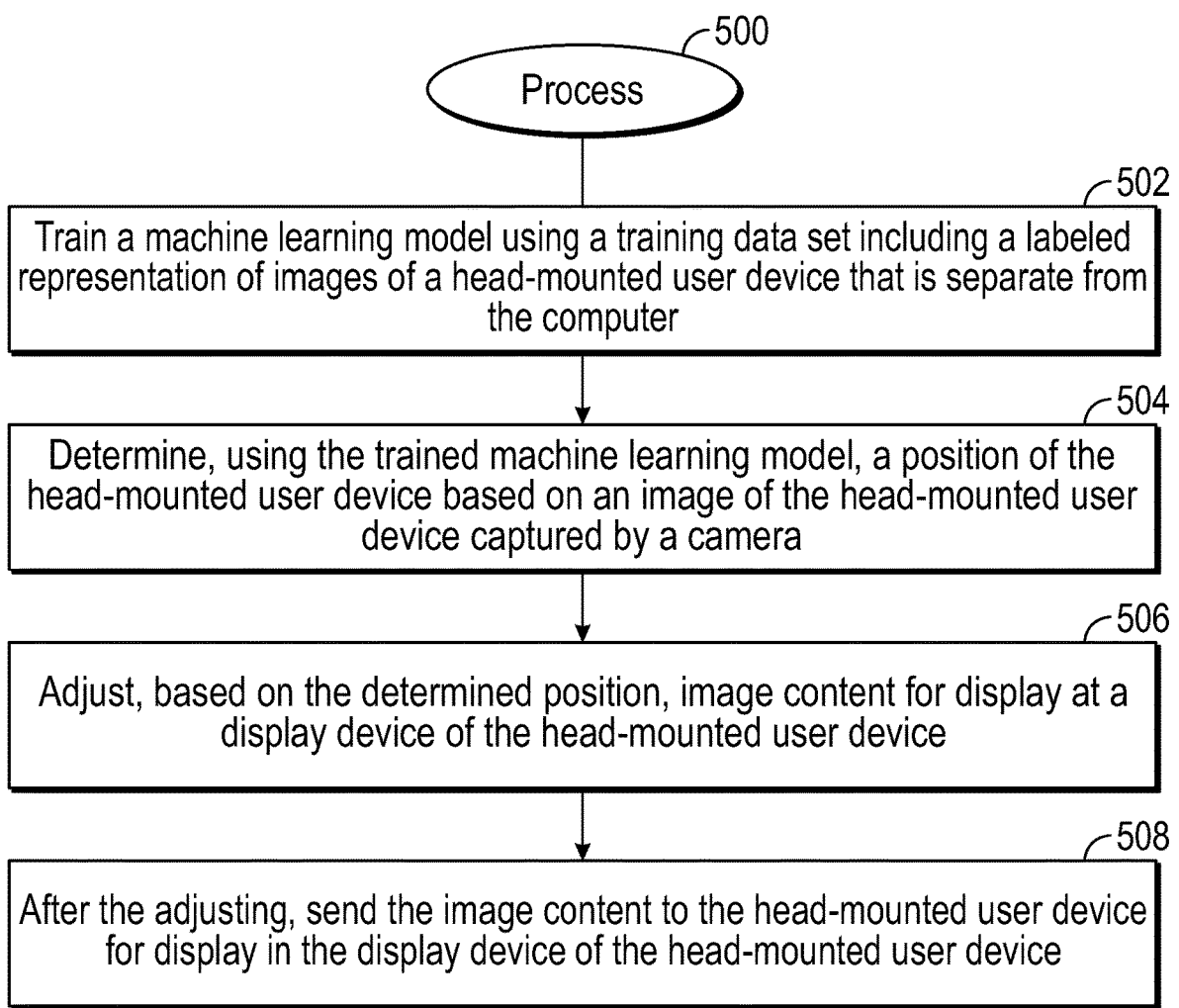
FIG. 5 is a flow diagram of a process according to some examples.

FIG. 5 is a flow diagram of a process 500 according to some examples, which can be performed by a computer. Although FIG. 5 shows a sequence of tasks of the process 500, note that the tasks can be performed in a different order in other examples, and/or the tasks can be replaced with different tasks, some tasks can be omitted, or additional tasks can be added.

The process 500 includes training (at 502) a machine learning model using a training data set including a labelled representation of images of a head-mounted user device that is separate from the computer. The labelled representation of the images includes labels relating to positions of the head-mounted user device.

The process 500 includes determining (at 504), using the trained machine learning model, a position of the head-mounted user device based on an image of the head-mounted user device captured by a camera.

The process 500 includes adjusting (at 506), based on the determined position, image content for display at a display device of the head-mounted user device.

The process 500 includes, after the adjusting, sending (at 508) the image content to the head-mounted user device for display in the display device of the head-mounted user device.

A storage medium (e.g., 300 in FIG. 3 or 406 in FIG. 4) can include any or some combination of the following: a semiconductor memory device such as a dynamic or static random access memory (a DRAM or SRAM), an erasable and programmable read-only memory (EPROM), an electrically erasable and programmable read-only memory (EE-PROM) and flash memory or other type of non-volatile memory device; a magnetic disk such as a fixed, floppy and removable disk; another magnetic medium including tape; an optical medium such as a compact disk (CD) or a digital video disk (DVD); or another type of storage device. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A non-transitory machine-readable storage medium comprising instructions that upon execution cause a computer to:
receive a plurality of image frames of a head-mounted user device that is separate from the computer, the head-mounted user device including a display device;
recognize, within a respective image of the plurality of images, the head-mounted user device;
determine, based on the respective image of the head-mounted user device, a position of the head-mounted user device; and
based on the determined position of the head-mounted user device, adjust display content in the display device of the head-mounted user device.

2. The non-transitory machine-readable storage medium of claim 1, wherein the recognizing and the determining of the position of the head-mounted user device based on the image of the head-mounted user device is based on a machine learning model.

3. The non-transitory machine-readable storage medium of claim 2, wherein the instructions upon execution cause the computer to: train the machine learning model using a training data set comprising a labelled representation of images of the head-mounted user device.

4. The non-transitory machine-readable storage medium of claim 3, wherein the labelled representation of the images of the head-mounted user device comprises labels relating to positions of the head-mounted user device.

5. The non-transitory machine-readable storage medium of claim 4, wherein the labels relating to the positions of the head-mounted user device comprise labels relating to locations in a three-dimensional space.

6. The non-transitory machine-readable storage medium of claim 4, wherein the labels relating to the positions of the head-mounted user device comprise labels relating to yaw, pitch, and roll of the head-mounted user device.

7. The non-transitory machine-readable storage medium of claim 1, wherein the determining of the position of the head-mounted user device comprises determining a distance of the head-mounted user device along a distance axis the respective image frame.

8. The non-transitory machine-readable storage medium of claim 1, wherein the determining of the position of the head-mounted user device comprises determining a location of the head-mounted user device in an X-Y plane.

9. The non-transitory machine-readable storage medium of claim 1, wherein the determining of the position of the head-mounted user device comprises determining a rotation of the head-mounted user device.

10. The non-transitory machine-readable storage medium of claim 1, wherein the head-mounted user device comprises a sensor to obtain a measurement based on a movement of the head-mounted user device, and wherein the instructions upon execution cause the computer to:
receive, at the computer, measurement data from the sensor,
wherein the determining of the position of the head-mounted user device is further based on the measurement data.

11. The non-transitory machine-readable storage medium of claim 1, wherein the adjusting of the display content in the display device of the head-mounted user device based on the determined position of the head-mounted user device comprises adjusting an augmented reality content or virtual reality content.

12. A computer comprising:
a communication interface to communicate with a head-mounted user device comprising a display device;
a processor; and
a non-transitory storage medium storing instructions executable on the processor to:
receive a plurality of image frames of the head-mounted user device;
recognize, within a respective image of the plurality of images, the head-mounted user device;
determine, based on the respective image of the head-mounted user device and using a machine learning model, a position of the head-mounted user device; and
based on the determined position of the head-mounted user device, adjust a display content in the display device of the head-mounted user device, wherein the display content is provided from the computer to the head-mounted user device through the communication interface.

13. The computer of claim 12, wherein the instructions are executable on the processor to:
train the machine learning model using a training data set comprising a labelled representation of images of the head-mounted user device.

14. The computer of claim 12, wherein the machine learning model is trained to recognize a portion of the head-mounted user device that includes the display device.

15. The computer of claim 12, wherein the non-transitory storage medium further stores the machine learning model.

16. The computer of claim 12, wherein the position of the head-mounted user device includes at least one of a spatial coordinate of the head-mounted user device, a yaw of the head-mounted user device, a pitch of the head-mounted user device, or a roll of the head-mounted user device.

17. A method of a computer, comprising:
training a machine learning model using a training data set comprising a labelled representation of images of a head-mounted user device that is separate from the computer, wherein the labelled representation of the images comprises labels relating to positions of the head-mounted user device;

recognizing, within a respective image of a plurality of images captured by a camera, the head-mounted user device using the trained machine learning model;

determining, using the trained machine learning model, a position of the head-mounted user device based on the respective image of the plurality of images captured by the camera;

adjusting, based on the determined position, image content for display at a display device of the head-mounted user device; and after the adjusting, sending the image content to the head-mounted user device for display in the display device of the head-mounted user device.

18. The method of claim 17, further comprising:

detecting a portion of the head-mounted user device based on the image of the head-mounted user device, wherein the portion includes the display device.

19. The method of claim 17, further comprising:

continually updating the training data set based on the determined position of the head-mounted user device.

20. The method of claim 19, further comprising:

updating the machine learning model based on the updated training data set.

\* \* \* \* \*